3,139,401
METHOD FOR REMOVING RUST FROM WATER SOFTENERS
Clifford C. Hach, Ames, Iowa, assignor to Hach Chemical Company, Ames, Iowa, a corporation of Iowa
No Drawing. Filed Jan. 5, 1962, Ser. No. 164,624
7 Claims. (Cl. 210—30)

The present invention relates to an improved method for dissolving and removing rust from ion exchange apparatus such as water softeners. More specifically, the invention relates to a method finding particular, but not necessarily exclusive use, in removing rust from the resin contained in ion exchange type water softeners which include a brine tank holding a supply of brine for use in automatically regenerating the ion exchange resin in the apparatus.

The invention has, as its principal objective, the removal of rust accumulations from ion exchange equipment, such as water softening equipment and from the ion exchange resins used in that equipment, the efficiency of which is reduced as rust collects. A more specific objective resides in the removal of rust from such equipment when used with a brine tank containing a supply of brine for use during the automatic regeneration of the equipment.

Another object of the present invention is to provide an improved method for removing rust from water softening equipment of the automatic regenerating type.

Other objects and advantages of the present invention will become apparent as the following description proceeds. While the present invention is embodied in a process finding particular, but not necessarily exclusive, utility for removing rust from automatically regenerated water softening equipment, certain modifications and alternative constructions will doubtless occur to those skilled in the art upon reading the following specification. It is nevertheless the intention to cover those modifications, alternative constructions, equivalents, and uses falling within the spirit and scope of the invention as expressed in the appended claims.

The zeolite or ion exchange process of softening water has been very widely used with satisfactory results. By such a process calcium and magnesium, and to some extent iron, ions are removed from hard water and are replaced by an equivalent quantity of sodium ions. The chemical reactions of such ion exchange process may be stated as follows:

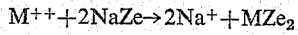

where M=metal ion such as calcium, magnesium, or iron, and Ze=zeolite or ion exchange resin.

The above process takes place during the water softening cycle and continues until the ion exchange resin has been exhausted. At that time it is necessary to regenerate or recharge the resin so that it is capable of further softening action. This is usually accomplished by treating the spent resin with a strong salt brine, usually a sodium chloride brine, although other sodium salts such as the sodium halogens can be employed. Treatment with a strong brine is capable of reversing the softening action as follows:

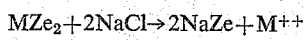

The metal ions ($M^{++}$) are then washed out of the bed by the flow of the salt brine.

One trouble which often occurs as the result of the continued use of the water softener, particularly in certain areas of the country, is the accumulation of iron rust in the equipment. This accumulation of rust occurs with the rust both in a loose form and in a form firmly attached to the particles of the ion exchange materials. This results in a number of difficulties, including (1) a reduction of ion exchange capacity as a result of the coating and clogging of the porous ion exchange resin particles with rust; (2) the occurrence of objectionable amounts of rust in the softener effluent water; and (3) accumulation of rust on softener valves, pipes and strainers thereby causing these devices to malfunction.

The rust accumulates in the softener when there is iron in the water which enters the softener. Water, as it is pumped from wells usually contains a quantity of dissolved iron, most often in the form of ferrous ($Fe^{++}$) salts. The water is thus clear in appearance when it is freshly pumped from a well. While the iron content of water varies widely according to location, iron generally is present in an amount less than about 10 parts per million, although higher amounts might occasionally be encountered.

Soluble iron in the ferrous form is removed from the water by the above described ion exchange process. However, when water containing ferrous iron is exposed to air, the iron is oxidized to ferric iron ($Fe^{+++}$) by the action of atmospheric oxygen. In the ferric form, iron in the water is converted to ferric hydroxide or rust. Rust is very insoluble and thus the water becomes rusty, and rust deposits appear on fittings, fixtures, and the like. In any water system there is invariably some leakage of air into the water so that iron is oxidized and rust is produced. Referring specifically to water softening equipment, ferric iron rust may be produced inside the softener itself as well as in other parts of the system so that ultimately a softener becomes fouled with rust when it is used on water containing iron.

Salt brine has in itself little capability for removing iron rust from a water softener bed. Most softeners, therefore, are subject to a very annoying and serious rust fouling problem. Many chemical agents have been proposed and used to clean rust from softener beds. In most instances these agents are of the type which can be added to the salt brine used to regenerate the softener which components will dissolve the accumulated rust and thus rinse it away during the regeneration process. One of the most successful compounds which has been used in this way is sodium hydrosulfite ($Na_2S_2O_4$).

Sodium hydrosulfite is subject to oxidation by atmospheric oxygen and is unstable when dissolved in water. For these reasons this compound is not suitable by itself as an additive to salt for use with water softeners which have a brine storage tank system. In such systems, which are usually employed with automatically regenerating water softeners, the brine is made and stored ready for use. If sodium hydrosulfite is added to this brine, it rapidly deteriorates and becomes ineffective for removing rust from the water softener.

In accordance with the present invention, there is provided an improved process for utilizing hydrosulfite salts, for example sodium hydrosulfite, to remove or dissolve rust from an ion exchange apparatus such as a water softener. To illustrate this process, sodium bisulfite ($NaHSO_3$) or sodium metabisulfite ($Na_2S_2O_5$), both of which are soluble in water or salt brine and form solutions which are quite stable, are dissolved in the brine storage tank of an automatic regenerating water softening system. A tank containing granules or porous sponge blocks of zinc or other metal is provided in the brine conduit between the brine tank and the water softener through which the brine is carried when it is required for use in regeneration. When the brine containing dissolved sodium bisulfite or sodium metabisulfite salts passes through the tank of zinc or other metal, these compounds react with the metal to form sodium hydrosulfite according to the following equations:

$$2NaHSO_3 + Zn \rightarrow Na_2S_2O_4 + Zn(OH)_2$$
$$Na_2S_2O_5 + H_2O + Zn \rightarrow Na_2S_2O_4 + Zn(OH)_2$$

The above process takes place in a satisfactory manner and quite rapidly when a small amount of sodium bisulfite is added to the salt and a brine is then made. For example, between about .5% and about 5% or possibly more, and preferably about 2%, sodium bisulfite in the brine can be utilized with excellent results. The brine containing the bisulfite is passed through a tank containing zinc metal preferably in an extended form such as granules, powder or sponge. Other metals can be employed with equal utility, and examples of such metals are aluminum, magnesium, and various zinc-aluminum alloys. Those skilled in the art will no doubt recognize that in addition to those metals enumerated, other metals as well can be employed and will appreciate that the type of metal is not critical so long as the desired result, namely the production of a sufficient amount of hydrosulfite is accomplished for the purpose of removing rust from the apparatus.

The brine containing the freshly generated hydrosulfite salt is then passed through the water softener in the usual manner in which it regenerates the ion exchange material and at the same time dissolves any iron rust which is present in the manner described above.

It will also be appreciated that when sodium chloride is employed it is advantageous to use sodium bisulfite or sodium metabisulfite. Again, it is important only that there be present in the brine bisulfite or metabisulfite ions and the particular metal ion of the bisulfite salt is not critical. Those skilled in the art will further appreciate that the bisulfites and metabisulfites of the various alkali metals such as lithium, sodium, potassium, rubidium, and cesium, and the various alkaline-earth metals, such as barium and calcium and strontium can be employed to advantage.

The amount of bisulfite salt added to the brine will be determined by the rust content of the water being treated, by the condition of the softening equipment, and in general by the economics of the process. Once a system is operating with the rust remover, only small amounts will be required. For fouled systems, the amount required initially will be somewhat larger, although as rust is removed the amount of rust remover can be reduced. For the most part the amounts of rust remover required will depend on the system being treated and no specific statement of amounts to be employed can be made. This can be easily determined by one skilled in the art in light of the foregoing description.

I claim as my invention:

1. In the process which comprises passage of a liquid over a bed of ion exchange resin to remove metal ions therefrom and intermittent regeneration of the bed of ion exchange resin by contact with a regeneration solution, the improvement whereby iron containing deposits resulting from the presence in said liquid of iron-containing constituents, are removed from the ion exchange resin at the time the same is regenerated which comprises (1) admixing with the regeneration solution a compound selected from the group consisting of alkali and alkali earth metal sulfites, bisulfites, metabisulfites and mixtures thereof and (2) contacting the regeneration solution containing said compound with a metal selected from the group consisting of zinc, aluminum, magnesium and alloys and mixtures thereof having substantial surface area prior to introducing the same to the bed of ion exchange resin for regeneration thereof.

2. The process of claim 1 wherein the treatment of the liquid by contact with the bed of ion exchange resin and the intermittent regeneration of the resin are carried out on an automatic basis and the regeneration solution is introduced to the ion exchange bed from a reservoir connected to the bed of ion exchange resin by automatically operated valve and pump means.

3. The process of claim 1 wherein the regeneration solution comprises sodium chloride brine.

4. The method of claim 1 wherein the compound selected from the group consisting of the alkali and alkaline earth metal sulfites, bisulfites, metabisulfites and mixtures thereof is admixed with the regeneration solution in an amount of from about 0.5% to about 5% by weight.

5. The method of claim 1 wherein the metal, with which the regeneration solution is contacted prior to introduction of said solution to the bed of ion exchange resin during the regeneration cycle, is zinc.

6. The process of claim 5 wherein the zinc is present in a finely divided state.

7. The process of claim 1 wherein the liquid from which the metal ions are removed is water, the compound admixed with the regeneration solution is selected from the group consisting of sodium sulfite, sodium bisulfite, sodium metabisulfite and mixtures thereof, the regeneration solution is a sodium chloride brine and the metal with which the regeneration solution is contacted prior to introduction to the bed of ion exchange resin during the regeneration cycle is particulate zinc.

References Cited in the file of this patent

UNITED STATES PATENTS 136,770     Schutzenberger et al. ____ Mar. 11, 1873

FOREIGN PATENTS 629,715     Canada _____ Oct. 24, 1961

OTHER REFERENCES

Chem. Abstracts, vol. 49, October–November 1955, page 14239b.

Liberation of Iron From Zeolite, Kitsuta (Japan 5370 (1954), Matsubara).